United States Patent Office 3,069,239
Patented Dec. 18, 1962

3,069,239
PURIFICATION OF HALOGENATED SILICON COMPOUNDS
William E Winter, Murrysville, and Rafael Diaz, Greensburg, Pa., assignors to Westinghouse Electric Corporation, East Pittsburgh, Pa., a corporation of Pennsylvania
No Drawing. Filed Oct. 28, 1958, Ser. No. 770,022
7 Claims. (Cl. 23—205)

This invention relates to improved chemical processes for the purification of silicon halides containing microquantities of impurities from which hyper-pure silicon may be prepared.

At the present time, rectifier and transistor grade silicon is prepared by decomposing silicon halides or silicon-hydrides with a reducing agent, for example, hydrogen, elemental zinc and elemental sodium. Commercially, pure silicon halides are currently prepared by hydrohalogenating the purest commercially available electro-furnace silicon. The most common practice is to hydrochlorinate or chlorinate the silicon to form a chloro-silicon compound such as silicon tetrachloride ($SiCl_4$) and trichlorosilane ($SiHCl_3$).

The electro-furnace silicon starting material is usually prepared by the reduction of silica in the presence of carbon or graphite. Silicon, thus prepared always contains appreciable amounts of carbon and other impurities.

The carbon and other impurities are usually readily chlorinated along with the silicon and are difficult to remove, and therefore, are usually carried over into the chloro-silicon compounds. The impurities that are usually present in the chloro-silicon compounds are chloro- or oxychloro- or other complex chloro-compounds of such elements as phosphorus, arsenic, silicon, germanium, strontium, titanium, zirconium, cerium, thorium, platinum, manganese, nickel, cobalt, tellurium, iodine, aluminum, chromium, iron, rhodium, copper, selenium, boron, niobium, tantalum, vanadium, molybdenum, tungsten, and uranium. The term "impurities" as employed hereinafter in the specification and claims is intended to refer to one or more of the previously enumerated compounds. It is believed that all of these impurities may be complexed in accordance with this invention. It will be understood, however, that all of these impurities may not be present in every batch of silicon halide.

Usually, these impurities are present in the chloro-silicon compounds in only micro-quantities and are not entirely discernible by currently available analytical chemical means. Even in such microscopic amounts, the impurities are capable of rendering the elemental silicon prepared from such chloro-silicon compounds unsatisfactory for use in rectifiers and other semiconductor devices.

To date, numerous processes have been proposed for the removal of the micro-quantity impurities described above, however, non of these processes have been found to be completely satisfactory from the standpoint of ease of application, completeness of removal of trace impurities and practicability.

The surprising discovery has now been made that these impurities can be substantially totally removed from silicon halides by contacting a silicon halide with molybdate and related chemical complexing agents which are described more fully herein.

An object of the present invention is to provide a process for the purification of silicon halides comprising contacting said silicon halide with a select chemical complexing agent.

Another object of the present invention is to provide a silicon halide exceptionally free from impurities from which semiconductor grade hyperpure silicon can be produced.

Other objects of this invention will, in part, be obvious, and will, in part, appear hereinafter.

In accordance with the present invention and attainment of the foregoing objects, there is provided a process for the purification of silicon halides comprising (1) contacting said silicon halide with an excess of a complexing agent having a general formula:

$$A_aB_bO_c \cdot XH_2O$$

in which A is a cation selected from at least one of the group consisting of sodium, potassium, hydrogen, magnesium, silver, cerium, lead, calcium, strontium, barium, cadmium, zinc, manganese, cobalt, ammonium, nickel and copper, B is an atom selected from the group consisting of molybdenum, tungsten, vanadium, uranium, niobium and tantalum, said molybdenum, tungsten, uranium, niobium and tantalum having a chemical valence of $+6$ and said vanadium having a chemical valence of $+5$, said $a$, $b$ and $c$ having such a numerical value that the positive valence of ($A_a$) is equal to the negative valence of ($B_bO_c$), and said X varying in the range of from 0 to 24, said complexing agent will combine with substantially all the impurities in the silicon halide even in infinitesimally small quantities of the order of 1 part in a billion of silicon, and (2) recovering the purified silicon halide thus produced.

Broadly, semiconductor grade silicon is prepared in approximately three stages. (1) Silica is reduced in the presence of carbon or graphite to produce elementary silicon; (2) the silicon thus produced is hydro-halogenated to form a silicon halide which is carefully purified; and (3) silicon crystals are grown by decomposition from the purified silicon halide.

The production of elementary silicon by the reduction of silica is well known in the art and need not be discussed in any great detail herein. However, it should be understood that while this process is the most common commercially available process now known, the process has definite shortcomings relative to the preparation of silicon for use in semiconductor devices. The primary shortcoming being that during the reduction of the silica in an electro-furnace, the silicon metal produced contains carbon or graphite and various other impurities, examples of which includes, phosphorus, arsenic, germanium, strontium, titanium, zirconium, cerium, thorium, platinum, maganese, nickel, cobalt, tellurium, iodine, aluminum, chromium, iron, rubidium, copper, selenium, boron, niobium, tantalum, vanadium molybdenum, tungsten, and uranium. While the quantities of the above-mentioned impurities present are relatively small and difficult to discern by presently known analytical chemical methods, the quantity is sufficient to adversely affect the electrical properties of the silicon.

The silicon thus produced is reacted with a hydrohalogen compound, for example, HCl, at a temperature of approximately 300° C. (a catalyst, for example, copper may be employed) to produce at least one silicon halide compound. This process is well known in the art. While the reaction may be carried out with any hydrohalide compound, the usual practice is to employ hydrogen chloride as the halide with the resultant product being a mixture of trichlorosilane and silicon tetrachloride. While the most common hydrohalide compound employed is hydrogen chloride, it is to be understood that hydrogen bromide, hydrogen iodide and hydrogen fluoride, may also be used.

Some proportion of substantially all of the impurities that were present in the elementary silicon will be carried over into the silicon halide compound. In addition, to these impurities, further impurities will be introduced from the hydrogen halide compound and from the process

equipment and the shipping containers which are used to ship the silicon halide. Distillation and other purification procedures are applied to the silicon halide to reduce the impurities.

It is the purification of the silicon halide thus produced, which may contain up to 1000 p.p.m. of impurities, with which this invention is primarily concerned. In one practical adaptation of this invention, the silicon halide, for example, trichlorosilane, (hereafter reference will be made specifically to trichlorosilane but it will be understood other halides may be treated similarly) is introduced into a suitable vessel, preferably of quartz and allowed to contact the complexing agent of this invention. The complexing agent has the chemical formula:

$$A_aB_bO_c \cdot XH_2O$$

as defined above.

The complexing agent is a solid material having a melting point in the range of 600° C. to at least 1200° C. and, obviously, the boiling point is far in excess of that of the silicon halides.

Satisfactory results have been realized when the particles of complexing agent employed have had an average particle size that will pass through a screen in the range of 10 to 300 mesh size. The particle size is not critical, however, and larger particle sizes can be employed.

The grade of complexing agent employed is that sold commercially as chemically pure. As the silicon halide and complexing agent are intermixed, the complexing agent ionizes:

$$A_aB_bO_c \cdot XH_2O \rightleftarrows (A_a)_+ + (B_bO_c)_-$$

While the chemical theory of the reaction is not certain, it is believed that the impurities move from the silicon halide and become a part of the molecule of the complexing agent, for example.

$$(A_a)_+ + (B_bO_c)_- + (D)^+ \rightarrow A_aDB_bO_c \cdot XH_2O$$

in which A, B, and $a$, $b$ and $c$ have the meaning previously indicated. D is an impurity cation selected from at least one of the group consisting of phosphorus, arsenic, strontium, titanium, zirconium, cerium, thorium, platinum, manganese, nickel, cobalt, tellurium, iodine, aluminum, chromium, iron, rubidium, copper, selenium, boron, niobium, tantalum, vanadium, molybdenum, tungsten and uranium. The subscripts $a$, $b$, and $c$ are such magnitudes that the positive valence of the cation $(A_a)$ is equal to the negative valence of the group $(DB_bO_c)$. It will be understood that the signs (+) and (−) in the above equations indicate the nature of the charge and not the quantity thereof.

Examples of suitable complexing agents include:

$(NH_4)_2MoO_4$  
$(NH_4)_6Mo_7O_{24} \cdot 4H_2O$  
$(NH_4)_2W_4O_{13} \cdot 8H_2O$  
$(NH_4)_6W_7O_{24} \cdot 6H_2O$  
$NH_4VO_3$  
$BaMoO_4$  
$BaWO_4$  
$BaW_4O_{13} \cdot 9H_2O$  
$Ba_2U_2O_7$  
$CdWO_4$  
$CaMoO_4$  
$CaWO_4$  
$Ce_2(MoO_4)_3$  
$Ce_2(WO_4)_3$  
$PbMoO_4$  
$PbWO_4$  
$K_2MoO_4$  
$K_2WO_4 \cdot 2H_2O$  
$K_2W_4O_{13} \cdot 8H_2O$  
$K_6W_7O_{24} \cdot 6H_2O$  
$K_2UO_4$  
$Ag_2WO_4$  
$Na_2MoO_4$  
$Na_2MoO_4 \cdot 2H_2O$  
$Na_2Mo_2O_7$  
$Na_2Mo_3O_{10} \cdot 7H_2O$  
$Na_2Mo_4O_{13} \cdot 6H_2O$  
$Na_2Mo_8O_{25} \cdot 4H_2O$  
$Na_2Mo_{10}O_{31} \cdot 12H_2O$  
$Na_2WO_4$  
$Na_2WO_4 \cdot 2H_2O$  
$Na_6W_7O_{24} \cdot 16H_2O$  
$Na_2UO_4$  
$Na_3VO_4 \cdot 16H_2O$  
$Na_4V_2O_7$  
$SrMoO_4$  
$SrWO_4$ The boiling points of all of these complexing agents are very high, far above those of the silicon halides to which they are applied.

While the quantity of complexing agent necessary for the purification of the silicon halide is necessarily directly related to the quantity of impurities present in the silicon halide, experimental results have indicated that for each liter of the best currently available silicon halide at least 25 milligrams of the complexing agent must be used. An excess of the complexing agent is desirable. A quantity of 30 grams of complexing agent per liter of silicon halide has been found adequate to purify the lowest grade material considered suitable for use for semiconductor material at the present state of the art. While the contacting of the silicon halide and complexing agent may be accomplished in many ways, one of the preferred ways that has been found especially satisfactory is to charge the silicon halide and the complexing agent into the pot of a distillation tower. A particularly suitable distillation tower has been found to be one constructed of quartz, one meter in length having 5.6 theoretical plates, 6 to 10 actual plates.

Satisfactory results have been achieved when the heat mantle about the pot of the tower has been maintained at a temperature of approximately 400° C. and the top of the tower maintained at a temperature equal to the boiling point of the silicon halide, which in the case of trichlorosilane is 32° C. It should be understood that the temperature of the heat mantle is not critical and that it is only necessary to have the mantle at a temperature sufficient to overcome the pressure drop of the tower.

The separation of the purified silicon halide and complexing agent has been found to be most effective when the distillation is carried out for a period of time within the range of from 3 to 8 hours. A first or top cut is made amounting to from 3% to 10% by volume, based on the volume of the silicon halide, and is discarded. A second or product cut amounting to approximately from 60% to 80% by volume, based on the volume of the silicon halide, is then made. This product cut comprising the purified silicon halide, is the material used for growing silicon crystals. It should be understood that the quantity of top cut which is discarded, the product cut which is utilized for the growing of silicon crystals and the heel cut, that which is left in the distillation pot and discarded since it contains the complexing agent with the impurities, will depend on the quantity of impurities within the silicon halide and the size of the batch being purified.

Satisfactory results have also been achieved when the silicon halide and complexing agent have been charged into a flask equipped with a condenser and recycle means. The silicon halide and complexing agent are heated at a temperature at least equal to the boiling point of the silicon halide, but substantially below that of the complexing agent. The silicon halide vapor is allowed to pass through the condenser and recycle means until all of the silicon halide has been contacted by the complexing agent. The silicon halide may then be condensed and removed from the recycle line by means of a valve. The product cut again must be dependent upon the quantity of impurities contained in the silicon halide. Satisfactory results have been achieved when a product cut comprising between 60% and 80% by volume based upon the volume of the silicon halide is made after a small initial top cut has been made and discarded. Again, however, the volume of each cut is dependent upon the size of the batch and the quantity of impurities present.

A third method of contacting the silicon halide and complexing agent comprises admixing the two by vigorous stirring in a suitable container and then separating the purified silicon halide from the complexing agent by recrystallization or distillation.

The silicon halide thus purified may be purified a second time by the same process, however, this has not been found necessary in commercial practice.

It should be understood that the three methods described above for achieving both the contacting of the silicon halide and the complexing agent and their separation are provided only as illustrations of suitable procedures. The apparatus used is preferably quartz since it does not introduce traces of contaminants as would ordinary glass or metallic apparatus.

The following example is illustrative of the practice of this invention.

*Example I*

Approximately 3200 grams of trichlorosilane (SiHCl₃) (approximately 2400 cc.) and 105 milligrams of $$Na_2MoO_4 \cdot 2H_2O$$

were charged into the pot of a quartz distillation tower. The distillation tower was approximately 1 meter in length and of such design as to contain approximately 5.6 theoretical plates. The distillation tower, however, was packed with ½ inch quartz Rachig rings. The heat mantle surrounding the base of the pot of the distillation tower was maintained at a temperature of approximately 400° C. and the top of the tower was maintained at a temperature of approximately 32° C.

The distillation was allowed to carry on within the closed system for a period of approximately ½ hour. At the end of this time, approximately 200 cc. of distillate was removed from the tower and discarded. A product cut of 1800 cc. was then made.

The product cut contained hyperpure trichlorosilane from which a silicon crystal suitable for use in semiconductor devices could be made by pyrolytic decomposition.

An N-type silicon crystal was produced by pyrolytic decomposition from the 1800 cc. product cut of trichlorosilane. The resistivity of the crystal was determined over a length of 4 inches by measuring the resistivity at four different 1 inch intervals along its length. The resistivities measured were 110 ohm-centimeters, 78 ohm-centimeters, 45 ohm-centimeters and 49 ohm-centimeters. The silicon crystal thus produced from the trichlorosilane purified in accord with this invention was capable of being used in semiconductor diode devices upon which up to 1100 volts could be impressed.

Results equally satisfactory to those achieved in Example I can be realized by substituting:

| | |
|---|---|
| $(NH_4)_2MoO_4$ | $K_6W_7O_{24} \cdot 6H_2O$ |
| $(NH_4)_6Mo_7O_{24} \cdot 4H_2O$ | $K_2UO_4$ |
| $(NH_4)_2W_4O_{13} \cdot 8H_2O$ | $Ag_2WO_4$ |
| $(NH_4)_6W_7O_{24} \cdot 6H_2O$ | $Na_2MoO_4$ |
| $NH_4VO_3$ | $Na_2MoO_4 \cdot 2H_2O$ |
| $BaMoO_4$ | $Na_2Mo_2O_7$ |
| $BaWO_4$ | $Na_2Mo_3O_{10} \cdot 7H_2O$ |
| $BaW_4O_{13} \cdot 9H_2O$ | $Na_2Mo_4O_{13} \cdot 6H_2O$ |
| $Ba_2U_2O_7$ | $Na_2Mo_8O_{25} \cdot 4H_2O$ |
| $CdWO_4$ | $Na_2Mo_{10}O_{31} \cdot 12H_2O$ |
| $CaMoO_4$ | $Na_2WO_4$ |
| $CaWO_4$ | $Na_2WO_4 \cdot 2H_2O$ |
| $Ce_2(MoO_4)_3$ | $Na_6W_7O_{24} \cdot 16H_2O$ |
| $Ce_2(WO_4)_3$ | $Na_2UO_4$ |
| $PbMoO_4$ | $Na_3VO_4 \cdot 16H_2O$ |
| $PbWO_4$ | $Na_4V_2O_7$ |
| $K_2MoO_4$ | $SrMoO_4$ |
| $K_2WO_4 \cdot 2H_2O$ | $SrWO_4$ |
| $K_2W_4O_{13} \cdot 8H_2O$ | | in quantities ranging from 25 milligrams to 30 grams for the 105 milligrams of $Na_2MoO_4 \cdot 2H_2O$ of Example I.

Since certain changes in carrying out the above processes and in the product embodying the invention may be made without departing from the scope, it is intended that the accompanying description be interpreted as illustrative and not limiting.

We claim as our invention:

1. In the process for the purification of silicon halides containing micro-quantities of impurities comprising halogen compounds of elements other than silicon the steps comprising, (1) thoroughly admixing a silicon halide with a complexing agent having a general formula:

$$A_aB_bO_c \cdot XH_2O$$

in which A is a cation, selected from at least one of the group consisting of sodium, potassium, hydrogen, magnesium, calcium, strontium, barium, cadmium, zinc, manganese, cobalt, nickel, silver, lead, ammonium, cerium and copper, B is an ion selected from the group consisting of molybdenum, tungsten, vanadium, uranium, niobium and tantalum, said molybdenum, tungsten, uranium, niobium and tantalum having a chemical valence of +6 and said vanadium having a chemical valence of +5, said $a$, $b$, and $c$ being of such a quantity that the positive valence of $(A_a)$ is equal to the negative valence of $(B_bO_c)$, and said X varying in the range of from 0 to 24, said complexing agent being present in at least an amount capable of reacting with substantially all of the said impurities in the silicon halide, whereby said complexing agent combines with substantially all impurities in the silicon halides, and (2) separating the treated silicon halide from the complexing agent.

2. The process of claim 1 wherein at least 25 milligrams of the complexing agent are employed per liter of silicon halide.

3. In the process for the purification of silicon halides containing micro-quantities of impurities comprising halogen compounds of elements other than silicon the steps comprising, (1) thoroughly admixing a silicon halide with from 25 milligrams to 30 grams of a complexing agent per liter of silicon halide, said complexing agent having a general formula:

$$A_aB_bO_c \cdot XH_2O$$

in which A is a cation selected from at least one of the group consisting of sodium, potassium, hydrogen, magnesium, calcium, strontium, barium, cadmium, zinc, manganese, cobalt, nickel, silver, lead, ammonium, cerium and copper, B is an ion selected from the group consisting of molybdenum, tungsten, vanadium, uranium, niobium and tantalum, said molybdenum, tungsten, uranium, niobium and tantalum having a chemical valence of +6 and said vanadium having a chemical valence of +5, said $a$, $b$, and $c$ being of such quantity that the positive valence of $(A_a)$ is equal to the negative valence of $(B_bO_c)$, and said X varying in the range of from 0 to 24, and (2) separating the treated silicon halide from the complexing agent.

4. In the process for the purification of silicon halides containing micro-quantities of impurities comprising halogen compounds of elements other than silicon the steps comprising, (1) thoroughly admixing a silicon halide with from 25 milligrams to 30 grams of a complexing agent per liter of silicon halide, said complexing agent having a general formula:

$$A_aB_bO_c \cdot XH_2O$$

in which A is a cation selected from at least one of the group consisting of sodium, potassium, hydrogen, magnesium, calcium, strontium, barium, cadmium, zinc, manganese, cobalt, nickel, silver, lead ammonium, cerium and copper, B is an ion selected from the group consisting of molybdenum, tungsten, vanadium, uranium, niobium and tantalum, said molybdenum, tungstein, uranium, niobium and tantalum having a chemical valence of +6 and said vanadium having a chemical valence of +5, said $a$, $b$, and $c$ being of such quantity that the positive valence of $(A_a)$ is equal to the negative valence of $(B_bO_c)$, and said X varying in the range of from 0 to 24, and (2) separating the resultant product by distilling the silicon halide and recovering a purified silicon halide.

5. A process for the purification of trichlorosilone containing micro-quantities of impurities comprising halogen compounds of elements other than silicon comprising, (1) contacting said trichlorosilane with at least 25 milligrams of a complexing agent per liter of trichlorosilone, said complexing agent having a general formula:

$$A_aB_bO_c \cdot XH_2O$$

in which A is a cation selected from at least one of the group consisting of sodium, potassium, hydrogen, magnesium, calcium, strontium, barium, cadmium, zinc, manganese, cobalt, nickel, silver, lead, ammonium, cerium and copper, B is an ion selected from the group consisting of molybdenum, tungsten, vanadium, uranium, niobium and tantalum, said molybdenum, tungsten, uranium, niobium and tantalum having a valence of +6 and said vanadium having a valence of +5, said $a$, $b$ and $c$ being of such a quantity that the positive valence of ($A_a$) is equal to the negative valence of ($B_bO_c$), and said X varying in the range of from 0 to 24, whereby said complexing agent combines with substantially all of said impurities in the trichlorosilane, and (2) recovering the purified trichlorosilane thus produced.

6. A process for the purification of silicon tetrachloride containing micro-quantities of impurities comprising halogen compounds of elements other than silicon comprising, (1) contacting said silicon tetrachloride with at least 25 milligrams of a complexing agent per liter of silicon tetrachloride, said complexing agent having a general formula:

$$A_aB_bO_c \cdot XH_2O$$

in which A is a cation selected from at least one of the group consisting of sodium, potassium, hydrogen, magnesium, calcium, strontium, barium, cadmium, zinc, manganese, cobalt, nickel, silver, lead, ammonium, cerium and copper, B is an ion selected from the group consisting of molybdenum, tungsten, vanadium, uranium, niobium and tantalum, said molybdenum, tungsten, uranium, niobium and tantalum having a valence of +6 and said vanadium having a valence of +5, said $a$, $b$ and $c$ being of such a quantity that the positive valence of ($A_a$) is equal to the negative valence of ($B_bO_c$), and said X varying in the range of from 0 to 24, whereby said complexing agent combines with substantially all of said impurities in the silicon tetrachloride, and (2) recovering the purified silicon tetrachloride thus produced.

7. A process for the purification of trichlorosilane containing micro-quantities of impurities comprising halogen compounds of elements other than silicon comprising, (1) contacting said trichlorosilane with at least 25 milligrams of $Na_2MoO_4 \cdot 2H_2O$ per liter of trichlorosilane, whereby said $Na_2MoO_4 \cdot 2H_2O$ combines with substantially all of said impurities in the trichlorosilane, and (2) recovering the purified trichlorosilane thus produced.

References Cited in the file of this patent

UNITED STATES PATENTS 2,820,698   Krchma _____ Jan. 21, 1958

FOREIGN PATENTS 588,657   Great Britain _____ May 30, 1947